US012172830B2

(12) United States Patent
Schairbaum

(10) Patent No.: US 12,172,830 B2
(45) Date of Patent: Dec. 24, 2024

(54) PORTABLE AIR-TIGHT WATER-TIGHT REUSABLE TRASH RECEPTACLE

(71) Applicant: Ed Schairbaum, Hudson Oaks, TX (US)

(72) Inventor: Ed Schairbaum, Hudson Oaks, TX (US)

( * ) Notice: Subject to any disclaimer, the term of this patent is extended or adjusted under 35 U.S.C. 154(b) by 115 days.

(21) Appl. No.: 17/959,467

(22) Filed: Oct. 4, 2022

(65) Prior Publication Data

US 2023/0027424 A1 Jan. 26, 2023

Related U.S. Application Data

(63) Continuation-in-part of application No. 17/135,469, filed on Dec. 28, 2020, now Pat. No. 11,459,174, which is a continuation of application No. 16/193,782, filed on Nov. 16, 2018, now Pat. No. 10,875,709, which is a continuation-in-part of application No. 15/203,396, filed on Jul. 6, 2016, now Pat. No. 10,131,498.

(60) Provisional application No. 62/188,913, filed on Jul. 6, 2015.

(51) Int. Cl.
*B65F 1/16* (2006.01)
*B65F 1/00* (2006.01)

(52) U.S. Cl.
CPC .......... *B65F 1/1646* (2013.01); *B65F 1/0006* (2013.01); *B65F 2001/1676* (2013.01)

(58) Field of Classification Search
CPC .................. B65F 1/1615; B65F 1/1646; B65F 2001/1676
USPC .......................................... 220/318; 248/101
See application file for complete search history.

(56) References Cited

U.S. PATENT DOCUMENTS

| | | | | |
|---|---|---|---|---|
| 3,204,866 A | | 9/1965 | Brighton | |
| 3,261,545 A | | 7/1966 | Frazier | |
| 3,592,352 A | * | 7/1971 | Shirae | B65D 45/20 220/318 |
| 3,870,261 A | | 3/1975 | McSwain | |
| 4,488,697 A | * | 12/1984 | Garvey | B65F 1/1415 248/101 |
| 5,385,251 A | | 1/1995 | Dunn | |
| 5,799,909 A | * | 9/1998 | Ziegler | B65F 1/1415 248/101 |
| 5,882,119 A | | 3/1999 | Fadal, II | |
| 5,950,251 A | | 9/1999 | Cost | |
| 8,910,821 B1 | | 12/2014 | Stravitz | |
| 9,675,525 B2 | | 6/2017 | McBean | |
| 10,131,498 B1 | | 11/2018 | Schairbaum | |
| 10,875,709 B1 | | 12/2020 | Schairbaum | |

(Continued)

OTHER PUBLICATIONS

Office Action dated Nov. 6, 2017 from U.S. Appl. No. 15/203,396.

(Continued)

*Primary Examiner* — Stephen J Castellano
(74) *Attorney, Agent, or Firm* — James E. Walton

(57) ABSTRACT

A system and method for preventing leaks from rubbish containing liquids and noxious smells has an air-tight and water-tight reusable trash receptacle. The receptacle uses an inner ring and an outer ring to secure a bag. A lid contains a seal such that an air-tight and water-tight seal is formed when the lid is engaged with the outer ring. The outer ring has a seal that engages the bag such that an air-tight and water-tight seal is formed when the outer ring is engaged with the liner on the inner ring.

6 Claims, 20 Drawing Sheets

(56) References Cited

U.S. PATENT DOCUMENTS

| | | | |
|---|---|---|---|
| 2008/0023478 | A1 | 1/2008 | Cahill |
| 2008/0163965 | A1 | 7/2008 | McNelly |

OTHER PUBLICATIONS

Amendment dated Mar. 6, 2018 from U.S. Appl. No. 15/203,396.
Ex Parte Quayle Office Action dated Apr. 17, 2018 from U.S. Appl. No. 15/203,396.
Response to Ex Parte Quayle Office Action dated Jun. 14, 2018 from U.S. Appl. No. 15/203,396.
Notice of Allowance dated Jul. 31, 2018 from U.S. Appl. No. 15/203,396.
Office Action dated Mar. 11, 2020 from U.S. Appl. No. 16/193,782.
Amendment dated May 13, 2020 from U.S. Appl. No. 16/193,782.
Final Office Action dated Jun. 4, 2020 from U.S. Appl. No. 16/193,782.
Amendment After Final dated Jul. 24, 2020 from U.S. Appl. No. 16/193,782.
Advisory Action dated Aug. 4, 2020 from U.S. Appl. No. 16/193,782.
Amendment Under 37 C.F.R. § 1.114 dated Sep. 4, 2020 from U.S. Appl. No. 16/193,782.
Notice of Allowance dated Nov. 10, 2020 from U.S. Appl. No. 16/193,782.
Corrected Notice of Allowance dated Nov. 25, 2020 from U.S. Appl. No. 16/193,782.
Office Action dated Apr. 6, 2022 from U.S. Appl. No. 17/135,469.
Amendment dated Jun. 1, 2022 from U.S. Appl. No. 17/135,469.
Notice of Allowance dated Aug. 12, 2022 from U.S. Appl. No. 17/135,469.

* cited by examiner

PORTABLE AIR-TIGHT WATER-TIGHT REUSABLE TRASH RECEPTACLE

This application is a continuation-in-part of U.S. patent application Ser. No. 17/135,469, filed on 28 Dec. 2020 now U.S. Pat. No. 11,459,174, titled "Portable Air-Tight Water-Tight Reusable Trash Receptacle," which is a continuation of U.S. patent application Ser. No. 16/193,782, filed on 16 Nov. 2018, titled "Portable Air-Tight Water-Tight Reusable Trash Receptable," which issued on 29 Dec. 2020 under U.S. Pat. No. 10,875,709, which is a continuation-in-part of U.S. patent application Ser. No. 15/203,396, filed on 6 Jul. 2016, titled "Portable Air-Tight Water-Tight Reusable Trash Receptacle," which issued on 20 Nov. 2018 under U.S. Pat. No. 10,131,498, which claimed the benefit of U.S. Provisional Patent Application No. 62/188,913, filed on 6 Jul. 2015, titled "Portable Air-Tight Water-Tight Reusable Trash Receptacle."

BACKGROUND

1. Field of the Invention

The present application relates in general to the field of portable trash cans, more specifically, to trash cans featuring a hermetic seal to prevent migration of odors and contents of the trash can.

2. Description of Related Art

Current trash cans are typically an open vessel designed to hold up a plastic bag. The bag acts as a liner and the can acts as a support for the liner. Some trash cans have lids that rest on the top of the can to mitigate migration of aroma from the can. Portable trash cans, such as those for vehicles, are typically soft sided and configured to retain a trash bag. Lids for current portable trash receptacles rest on the lip of the trash can without the ability to prevent leakage if the receptacle is inverted or falls over. A need exists for portable trash receptacles that can retain liquids, odors, and noxious refuse no matter the orientation of the receptacle. While there are many ways to store trash well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
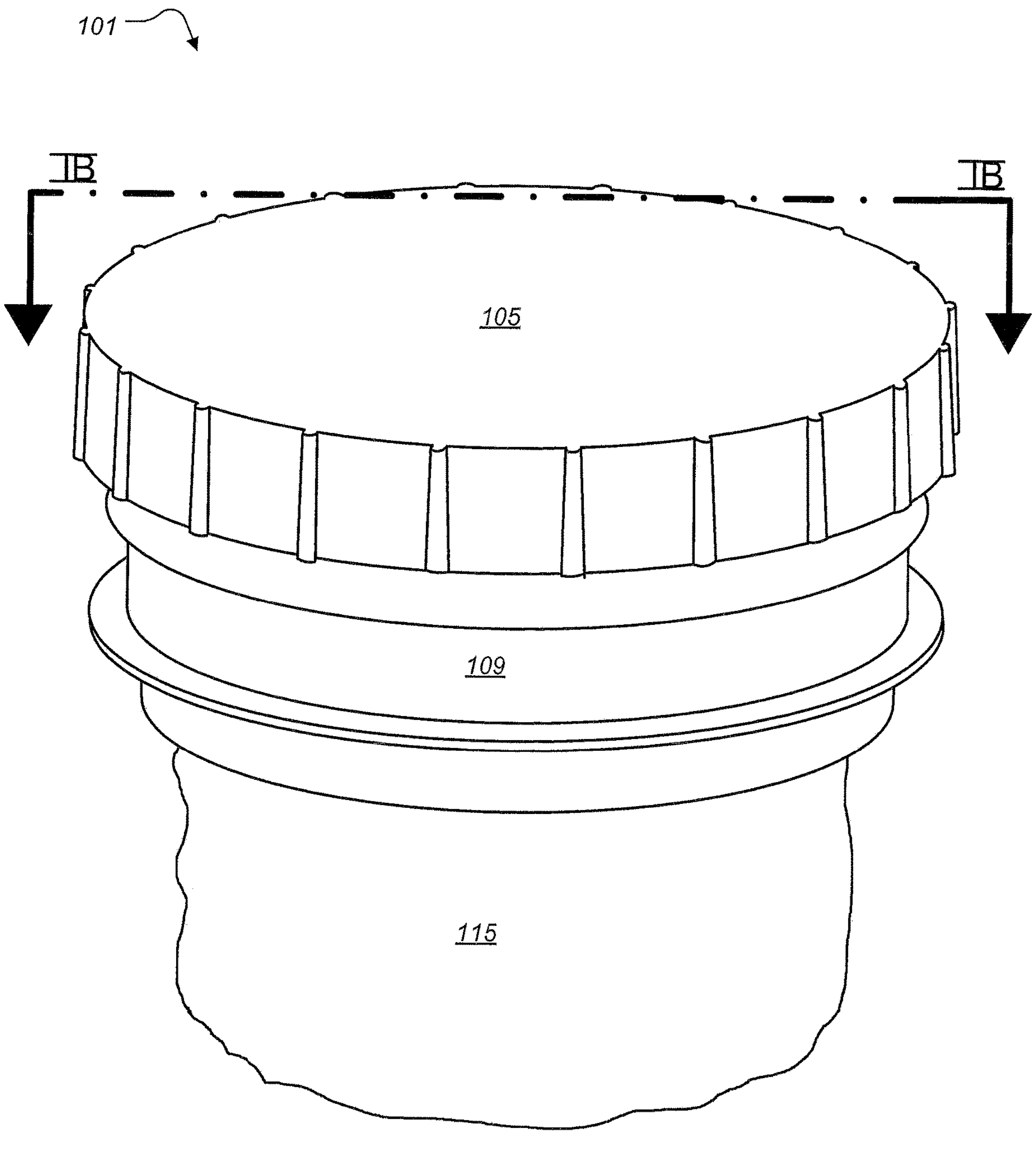
FIG. 1A is a perspective view of a portable air-tight water-tight reusable trash receptacle according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of a portable air-tight water-tight reusable trash receptacle are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A lidded trash receptacle is air-tight, water-tight, and prevents liquid contents and noxious fumes from escaping the receptacle. The receptacle includes a lid, a fabric cover, an outer ring, and an inner ring. The lidded receptacle allows a user to dispose of items, such as a six pack of soda, an ice cream cone, vomit, and or a baby diaper, without worrying about the receptacle leaking liquids or gases.

Figure 1B:
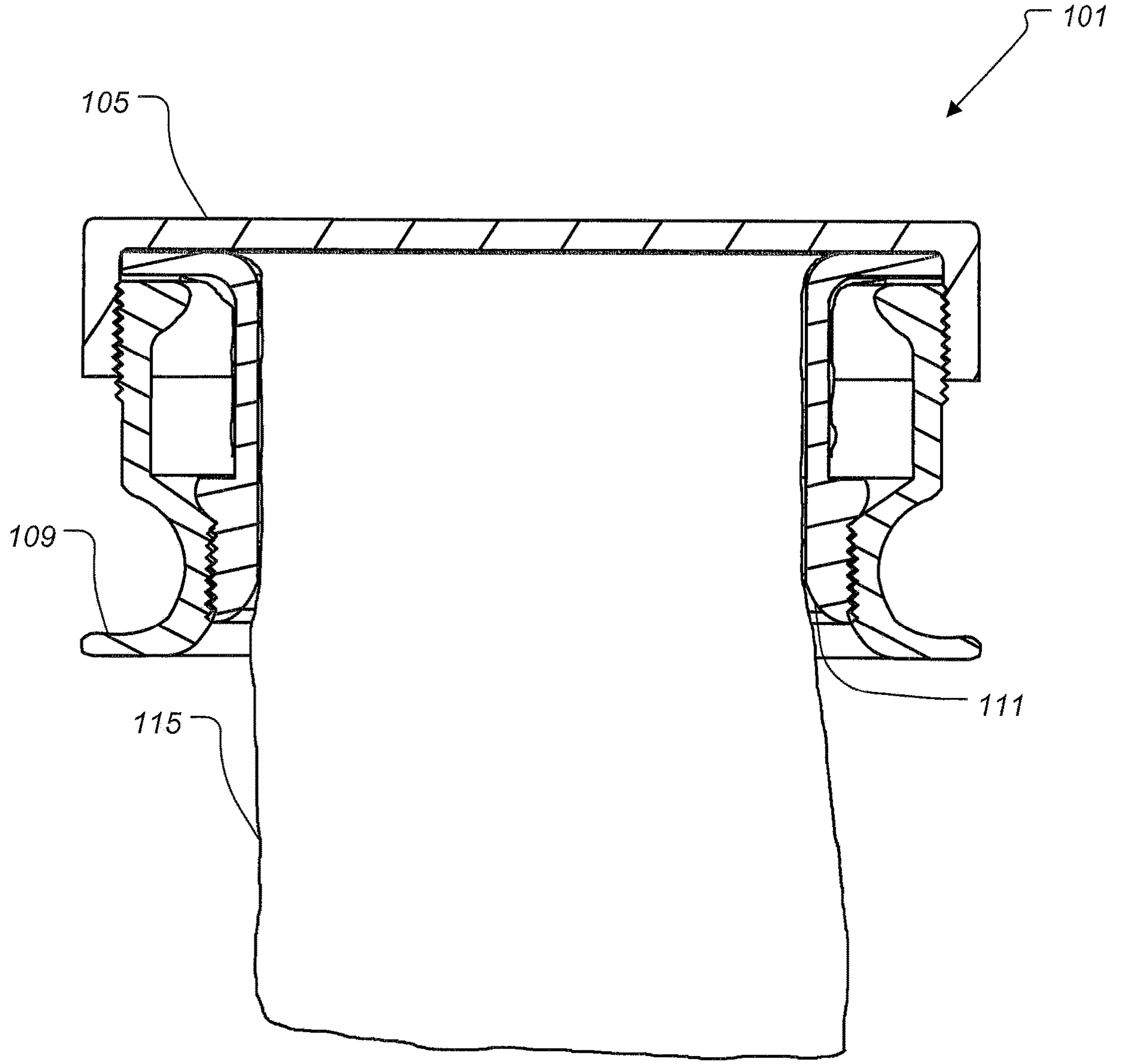
FIG. 1B is a cross section view of a portable air-tight water-tight reusable trash receptacle according to the present application.

Referring now to FIG. 1A, a perspective view of a portable air-tight water-tight reusable trash receptacle according to the present application is illustrated. Referring now also to FIG. 1B a cross section view, taken at line IB, of a portable air-tight water-tight reusable trash receptacle according to the present application is illustrated. Trash receptacle 101 is comprised of a lid 105, an outer ring 109, and an inner ring 111. A trash bag 115 is located between the outer ring 109 and the inner ring 111. Not shown is a fabric cover that is secured to the outer ring that protects the contents of the trash bag and prevents the contents of the trash bag 115 from being visible outside the receptacle.

Inner ring 111 is coupled to outer ring 109 by threading. A user would place the trash bag inside the inner ring 111 pulling the top of the trash bag 115 over the top of the inner ring into the region between the inner ring and the outer ring. The user would then screw the outer ring relative to the inner ring to secure the trash bag in place. Inner ring has a compressible ring, such as a rubber seal, located between the inner ring and the outer ring. Rubber seal provides friction between the trash bag 115 and the rings.

Lid 105 is coupled to the outer ring 109 by a threaded interface. Lid 105 uses a rubber seal located inside the lid to further seal the contents of the trash bag 115. A user can unscrew the lid from the outer ring and the trash bag is retained. Liquids and solids are contained inside the trash bag 115 and prevented from leaking by lid 105.

Figure 2A:
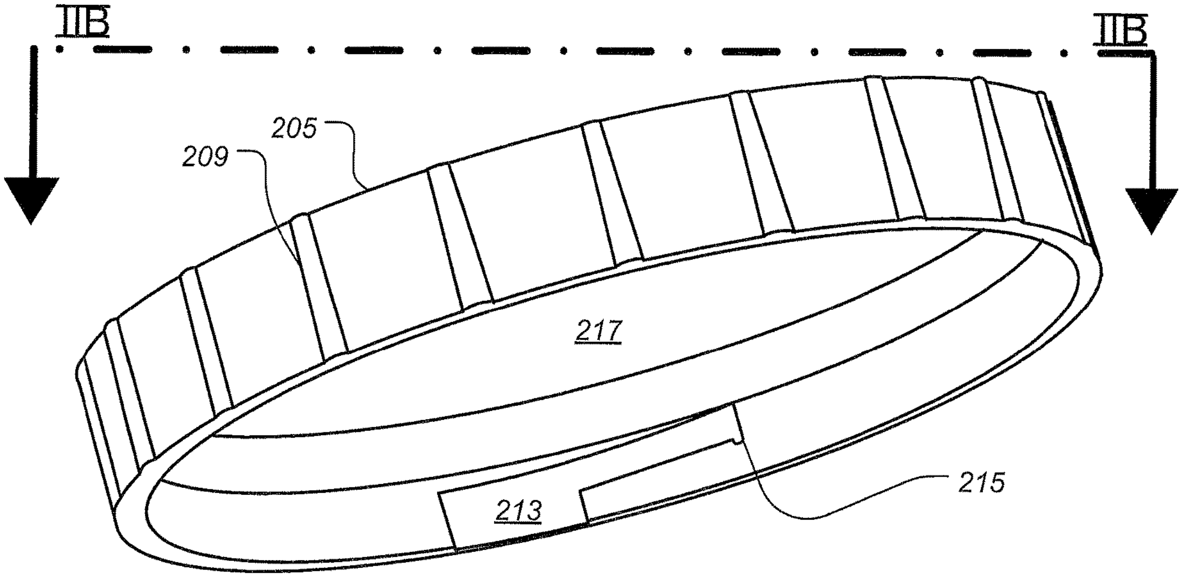
FIG. 2A is a perspective view of a lid for a portable air-tight water-tight reusable trash receptacle according to the present application.
Figure 2B:
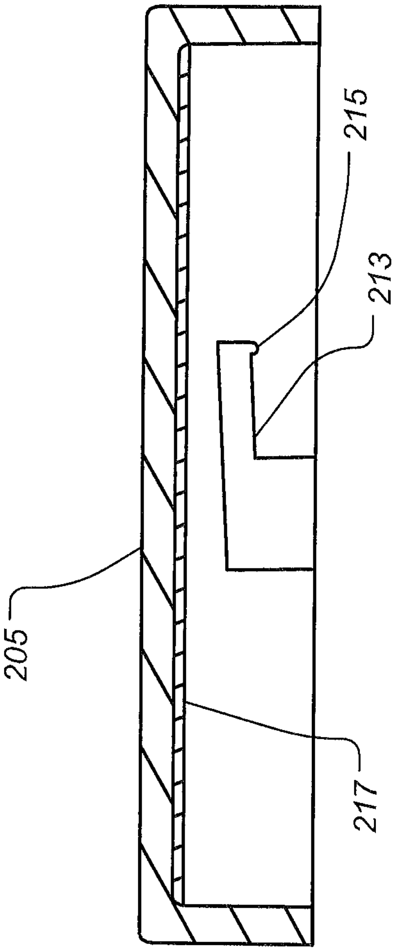
FIG. 2B is a cross section view of a lid for a portable air-tight water-tight reusable trash receptacle according to the present application.

Referring now also to FIG. 2A, a perspective view of a lid for a portable air-tight water-tight reusable trash receptacle according to the present application is illustrated. Referring now also to FIG. 2B a cross section view, taken at line IIB, of a lid fora portable air-tight water-tight reusable trash receptacle according to the present application is illustrated. Lid 205 is similar to that of lid 105. Lid 205 uses a plurality of ridges 209 around the circumference of the lid to facilitate a user's grip on the lid. Additionally, lid 205 has a slot 213 or keyway for receiving a tab from the outer ring of the trash receptacle. Slot 213 uses notch 215 to lock the lid 205 in place by receiving a protrusion off the tab. Users of the lid 205 depress the lid and rotate to secure the tab of the outer ring into the slot 213. To remove the lid 205 from the receptacle the process is revered. Lid 205 uses a seal 217, preferably rubber, to keep the contents of the secured trash bag inside. Seal 217 is located inside the lid and engages the top of the outer ring.

Figure 3A:
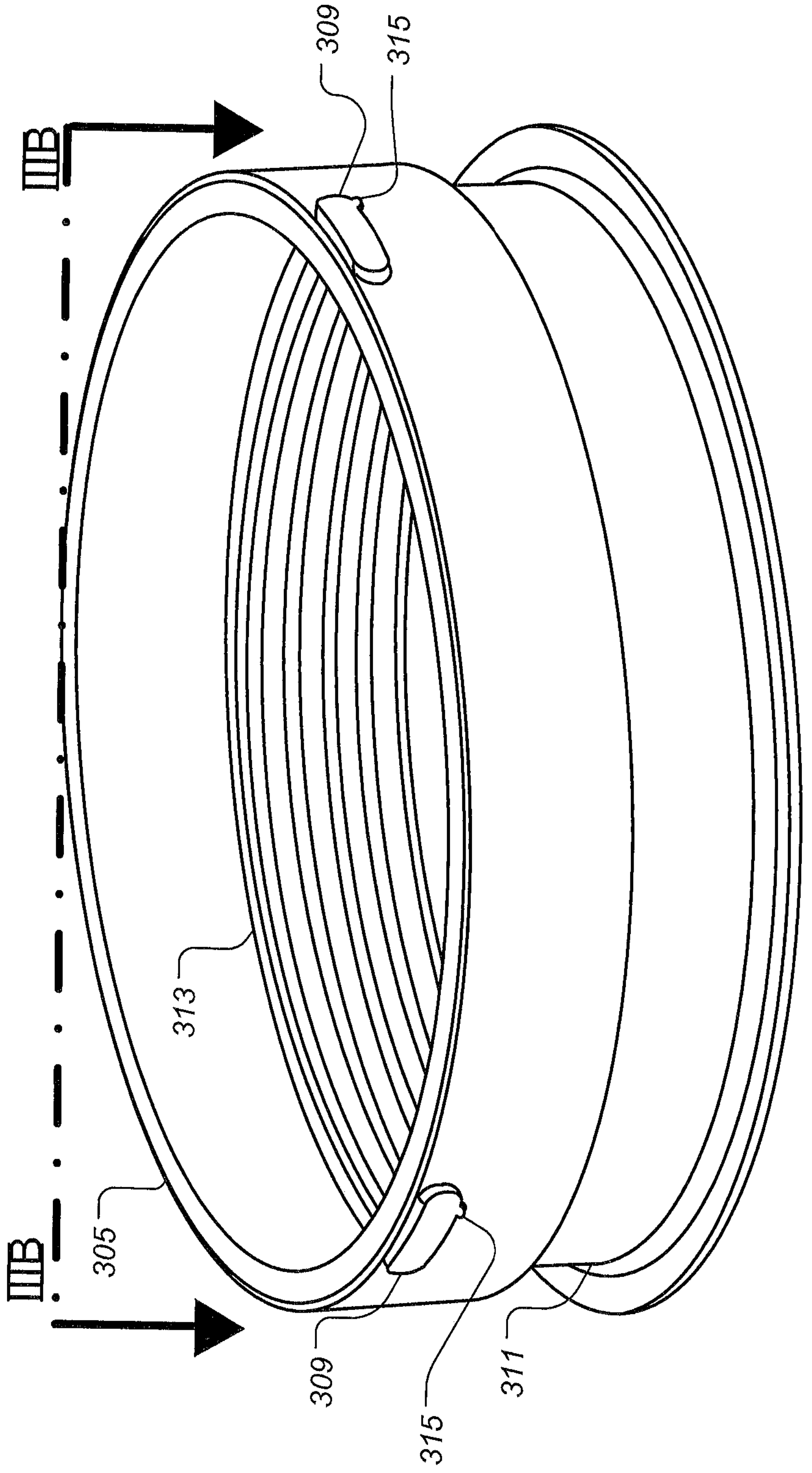
FIG. 3A is a perspective view of an outer ring for a portable air-tight water-tight reusable trash receptacle according to the present application.
Figure 3B:
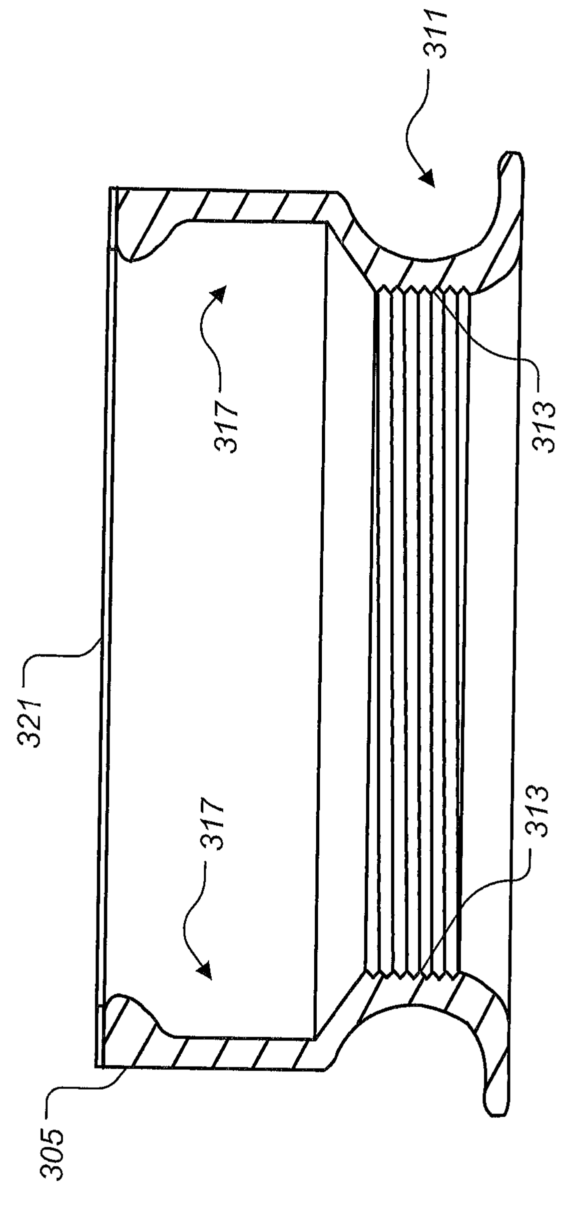
FIG. 3B is a cross section view of an outer ring for a portable air-tight water-tight reusable trash receptacle according to the present application.

Referring now also to FIG. 3A, a perspective view of an outer ring for a portable air-tight water-tight reusable trash receptacle according to the present application is illustrated. Referring now also to FIG. 3B a cross section view, taken at line IIIB, of an outer ring for a portable air-tight water-tight reusable trash receptacle according to the present application is illustrated. Outer ring 305 is similar to that of outer ring 109. Outer ring 305 features tabs 309 for securing a lid. Tabs 309 use protrusions 315 to lock the lid 205 in place. In an alternative embodiment the outer ring 305 is threaded to couple to a lid. Additionally outer ring 305 includes a notch 311 configured for receiving an elastic strap of a fabric cover and thereby securing the fabric outer cover to the outer ring 305.

On an internal surface of the outer ring 305 is threading 313. Threading 313 is configured for coupling the outer ring 305 to an inner ring, such as inner ring 111. Recess 317 is located interior to the outer ring 305 and is configured such that an opening is produced when an inner ring and the outer ring 305 is coupled together, Recess 317 provides room for the excess edges of the liner. Additionally, recess 317 provides room for liner retention system. Liner retention system includes at least one of an elastic strap or Velcro strap to hold the liner to the inner ring. A seal 321, preferably rubber, is located on a top surface of the outer ring 305 to hold the liner in place, alternatively the outer ring 305 does not include a seal 321.

Figure 4A:
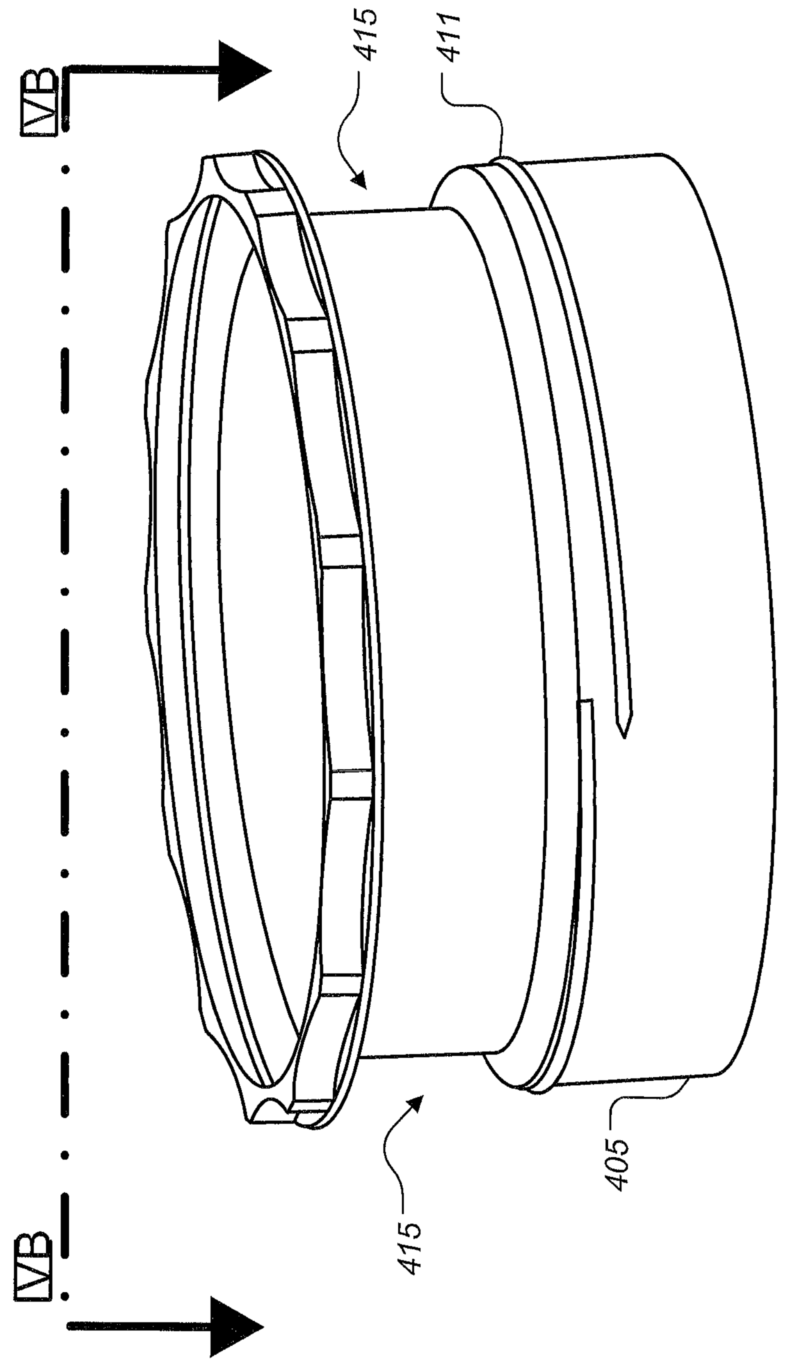
FIG. 4A is a perspective view of an inner ring for a portable air-tight water-tight reusable trash receptacle according to the present application.
Figure 4B:
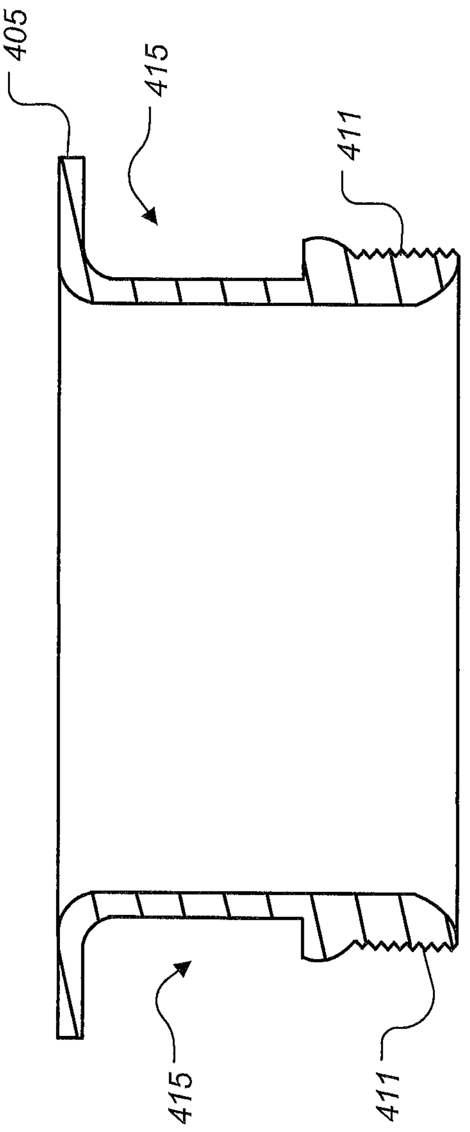
FIG. 4B is a cross section view of an inner ring for a portable air-tight water-tight reusable trash receptacle according to the present application.

Referring now also to FIG. 4A, a perspective view of an inner ring for a portable air-tight water-tight reusable trash receptacle according to the present application is illustrated. Referring now also to FIG. 4B a cross section view, taken at line IVB, of an inner ring for a portable air-tight water-tight reusable trash receptacle according to the present application is illustrated. Inner ring 405 is similar to that of inner ring 111. An external surface of inner ring 405 is threaded 411 such that the inner ring can couple to the outer ring. Recess 415 provides room for the excess edges of the liner or trash bag. Inner ring preferably has an inner diameter of at least 90 mm to provide room for a diaper to be disposed. Additionally, recess 415 provides room for a liner retention system. Liner retention system includes at least one of an elastic strap or Velcro strap to hold the liner to the inner ring 405.

Figure 5:
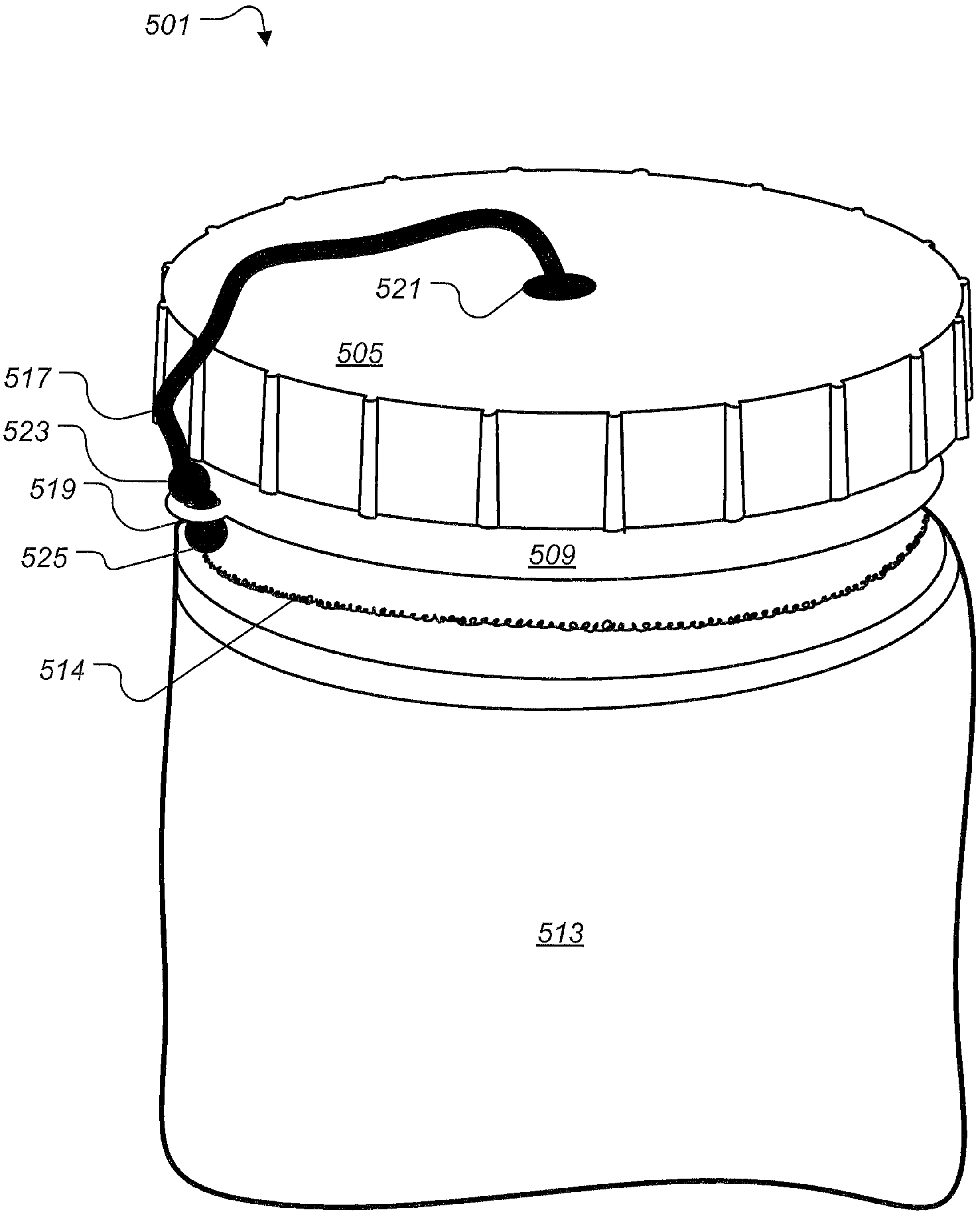
FIG. 5 is a perspective view of an alternative embodiment of a portable air-tight water-tight reusable trash receptacle according to the present application.

Referring now also to FIG. 5, a perspective view of a portable air-tight water-tight reusable trash receptacle with a tethered lid according to the present application is illustrated. Trash receptacle 501 is comprised of a tethered lid 505, a tabbed outer ring 509, and an inner ring. A trash bag or liner is located between the outer ring 509 and the inner ring 511. Cover 513, preferably fabricated from an opaque fabric, is secured to the outer ring 509 with an elastic strap and hides the contents of the trash bag within. Cover 513 has a Velcro seam along the top portion to allow the cover 513 to expand over the lower portion of the outer ring 509. Tether 517 is attached between a tab 519 on the outer ring 509 and the lid 505. Tether 517 is an integral extension of rubber seal 217. Tether 517 uses an extended piece of rubber formed off of the rubber seal to secure the lid. Located on the end of the tether 517 nearest the lid is a first stop 521. First stop 521 is disc shaped. Lid 505 is held between the first stop 521 and the rubber seal. A diameter of the first stop is larger than a diameter of a hole though the lid 505 to prevent the extended piece of the tether from falling through the hole in the lid. A second stop 523 and a third stop 525 are located on the far end of the extended piece of the tether 517. Second stop and third stop are spherical in shape and are configured to hold the opening of tab 519 between the second and third stops. Tethering the lid to the rest of the receptacle prevents the lid from being lost. Losing the lid prevents the receptacle from being water-tight.

Figure 6A:
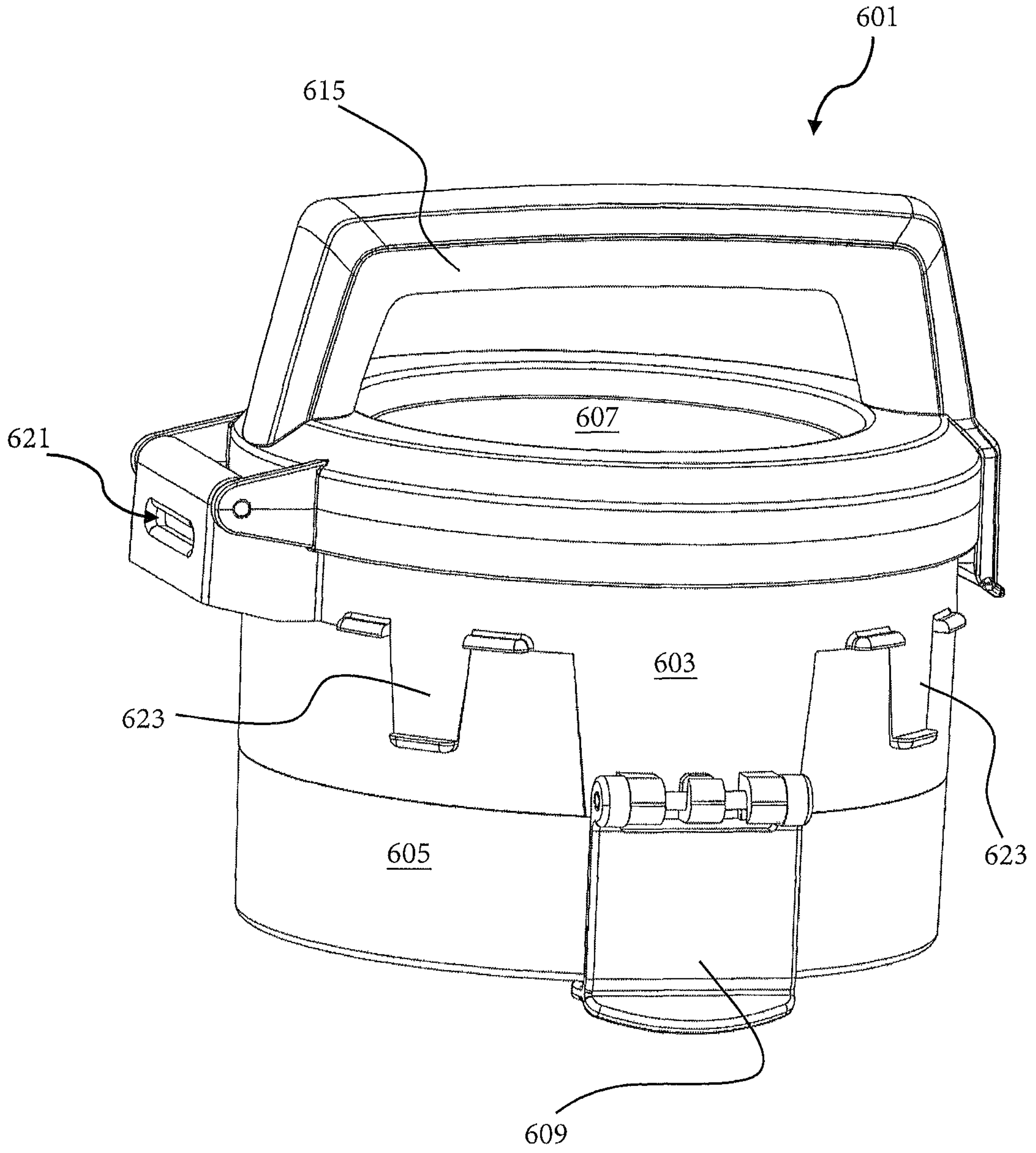
FIGS. 6A and 6B are perspective views of an alternative embodiment of a portable air-tight water-tight reusable trash receptacle according to the present application.
Figure 6B:
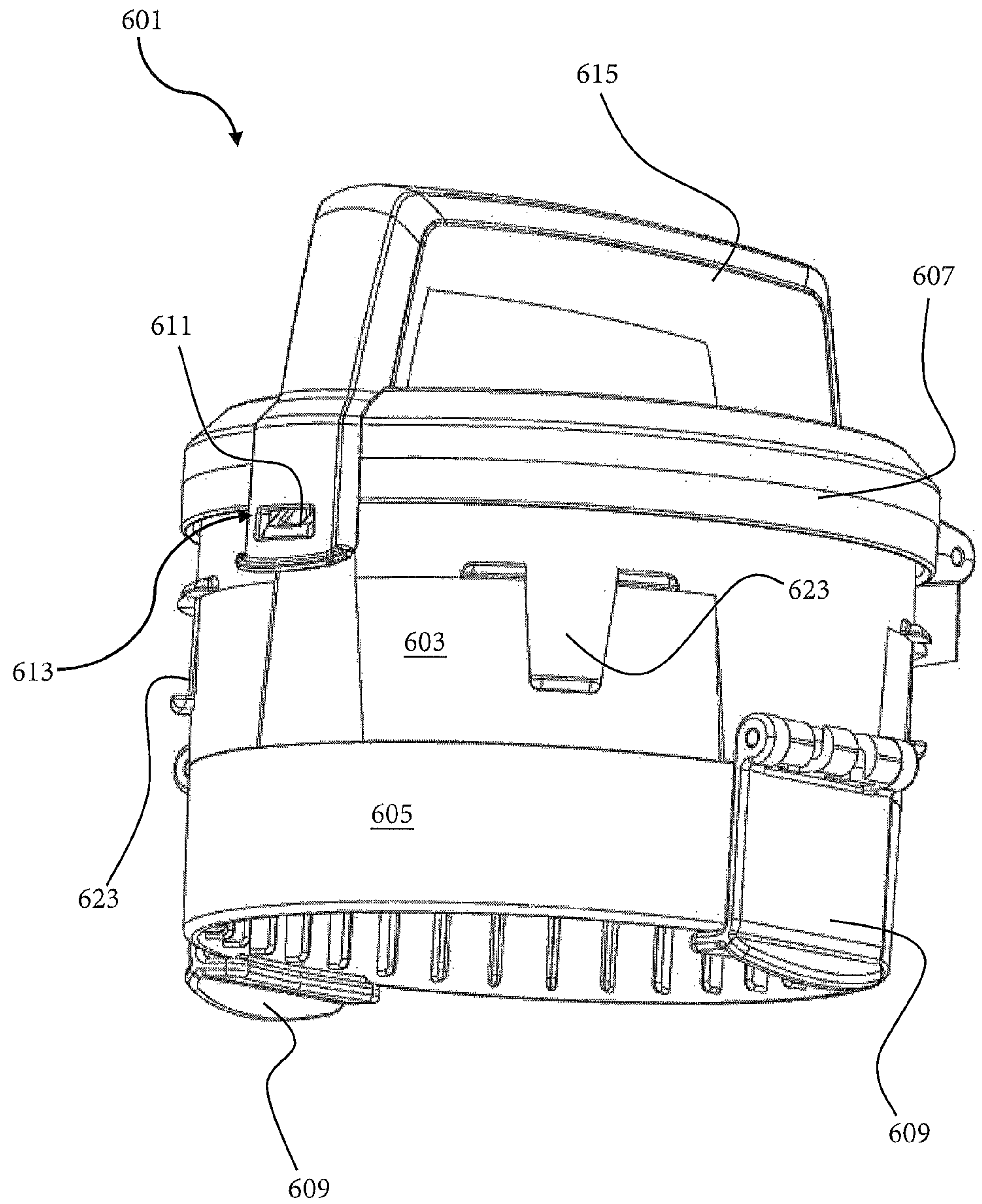

Referring now also to FIGS. 6A and 6B, an embodiment of a portable air-tight water-tight reusable trash receptacle with a hinged lid is shown. Trash receptacle 601 generally comprises an outer ring 603, an inner ring 605, and a hinged lid 607 that is hingeably attached to outer ring 603 and pivots relative to outer ring 603 between a closed position and an open position. Outer ring 603 contains hinged clips 609 that pivot with respect to outer ring 603 and secure inner ring 605 into outer ring 603 by clipping under the lower edge of inner ring 605. Outer ring 603 contains a lanyard slot 621 formed in it such that a lanyard or other tether used to carry trash receptacle 601 may be attached to lanyard slot 621. Hinged lid 607 contains a handle 615 attached to hinged lid 607 that may also be used to carry trash receptacle 601, and may also be used to open and close hinged lid 607.

Referring now specifically to FIG. 6B, outer ring 605 is shown to have a tab catch 611 formed in it. Handle 615 preferably has an opening 613 formed in it that cooperates with tab catch 611 when hinged lid 607 is closed such that tab catch 611 fits into opening 613 in handle 615 to secure hinged lid 607 into the closed position. Handle 615 is preferably designed and made of an appropriate material such that the portion of handle 615 containing opening 613 flexible enough to slightly bend so that handle 615 may be disconnected from tab catch 611. For example, in one embodiment, handle 615 may be made of a plastic or polymer that is strong enough to support the weight of trash receptacle 601 and any contained contents, but is flexible enough around opening 613 for tab catch 611 to be disengaged from opening 613 while hinged lid 607 is in the closed position, allowing hinged lid 607 to be opened.

Figure 6C:
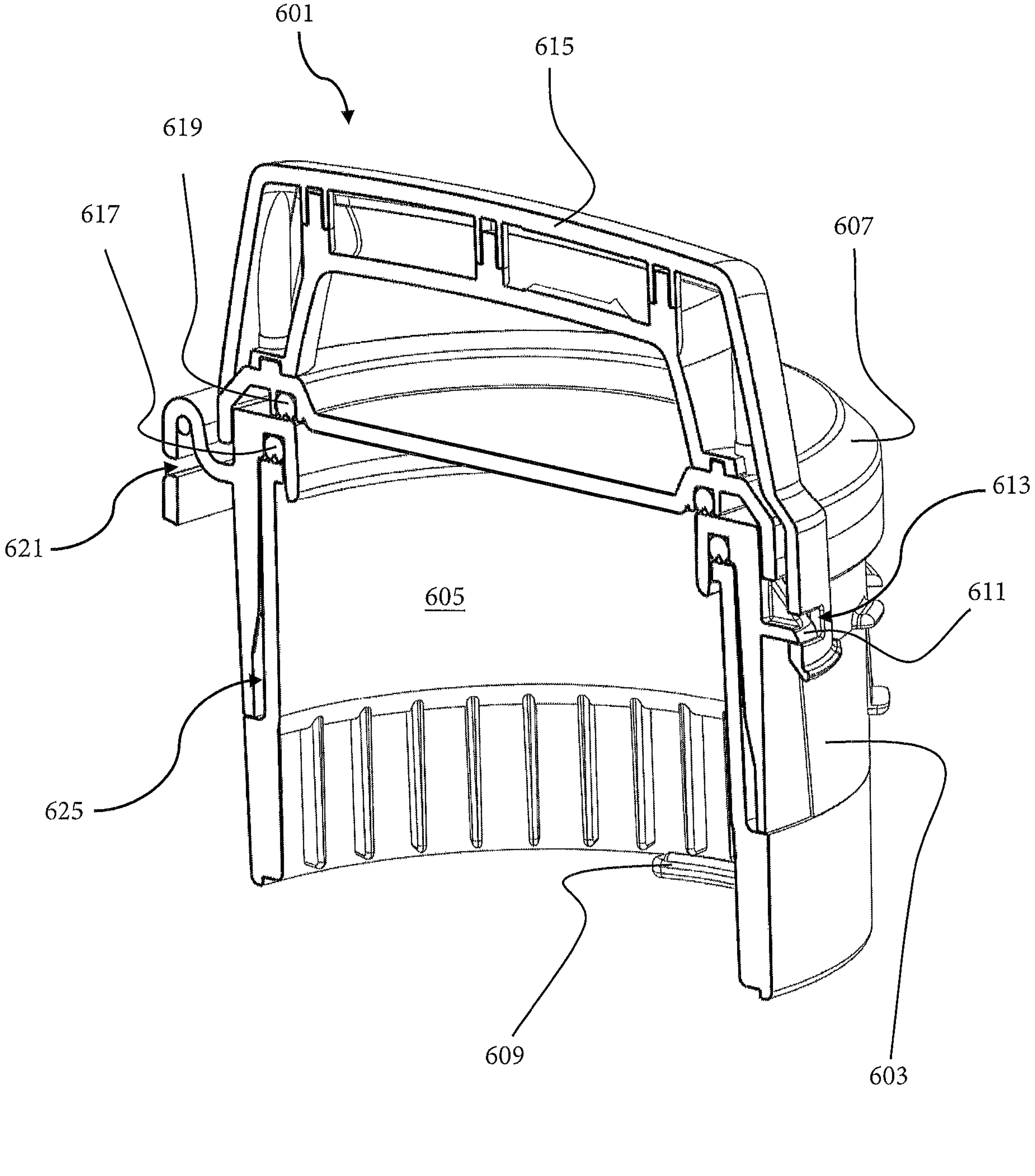
FIG. 6C is a cross-sectional view of the embodiment shown in FIGS. 6A and 6B.

Referring now also to FIG. 6C, a cross section of trash receptacle 601 is shown. The interior area of inner ring 605 is visible, and inner ring 605 is shown to fit into outer ring 603. It should be understood that a certain amount of clearance between inner ring 605 and outer ring 603 is necessary in order that a trash bag or liner may be located between inner ring 605 and outer ring 603. In use, inner ring 605 is disconnected and removed from outer ring 603 by unlatching hinged clips 609 from inner ring 605. A trash bag or liner (not shown) is partially inserted through the interior area of inner ring 605, while a certain portion of the liner near the opening of the liner is folded over the top edge of inner ring 605 onto the side of inner ring 605 opposite the interior area. Inner ring 605, along with the liner, is then inserted into outer ring 603 and secured by hinged clips 609. The clearances between inner ring 605 and outer ring 603 accommodate the inserted liner. A specific clearance area 625 is formed between inner ring 605 and outer ring 603. Clearance area 625 is sized such that excess edges of the liner are held within clearance area 625.

Outer ring 603 contains a seal, preferably an O-ring seal 617, held within outer ring 603 to cooperate and align with the top edge of inner ring 605. When a trash bag or liner is secured between outer ring 603 and inner ring 605, O-ring seal 617 is held against the liner such that an air-tight and water-tight seal is formed between the liner and seal 617, preventing any liquids or odors from escaping between outer ring 603 and inner ring 605. Hinged lid 607 also contains a seal, preferably an O-ring seal 619, held within it such that O-ring seal 619 aligns with and seals against the top edge of outer ring 603. This forms an air-tight and water-tight seal between hinged lid 607 and inner ring 603 such that liquids or odors within the liner are prevented from escaping between hinged lid 607 and inner ring 603. Due to the presence of O-ring seals 617 and 619, trash receptacle 601 is functionally completely water-tight and air-tight when a liner is held within trash receptacle 601.

Referring again to FIGS. 6A and 6B, strap seats 623 are shown formed in outer ring 603. Trash receptacle 601 should be understood to include a cover (not shown) to support a trash bag or liner held within receptacle 601. The cover may be similar to cover 513, or may be somewhat different. The cover preferably has an open end and a closed end. The cover of receptacle 601 preferably is made of an opaque fabric such that a liner and any of its contents are not visible when secured within receptacle 601, The open end of the cover is pulled over the exterior areas of inner ring 605 and outer ring 603, as well as hinged clips 609, and is drawn over strap seats 623. The cover may have an elastic strap held within the cover at the open end such that the elastic strap secures into strap seats 623 allowing the cover to support itself on outer ring 603. Alternatively, the cover may have a strap that requires manual tightening, such as a hook-and-loop type strap or a pull-tight B-ring type strap, such that a user must manually tighten the strap into strap seats 623 after pulling the open end of the cover over strap seats 623.

The cover for receptacle 601 preferably is of a rectangular box shape, rather than a simple tube sleeve shape. By being a box shape, the cover offers greater capacity than a simple tube sleeve-shaped cover of the same length. Any number of commonly available trash bags, liners, or other such bags may be used in receptacle 601 and held within the cover. Alternatively though, dedicated liners designed to correspond and cooperate with the box-shaped cover may be used in receptacle 601.

As shown in FIGS. 6A and 6B, tab catch 611 is positioned on outer ring 603 roughly directly across from the hinge that secures hinged lid 607. It should be understood that this merely anticipates one suitable location for tab catch 611, and that tab catch 611 may be positioned at any point near the upper edge of outer ring 603 that allows hinged lid 607 to be secured into the closed position. Handle 615, along with opening 613, may be arranged on hinged lid 607 to correspond with any of the possible suitable positions of tab catch 611. Only one tab catch 611 is shown, but other embodiments may utilize more than one tab catch. Also as show in FIGS. 6A and 6B, two hinged clips 609 are shown securing inner ring 605 into outer ring 603. Alternative embodiments of trash receptacle 601 may utilize more or fewer hinged clips depending on the design objective and requirements.

Figure 7:
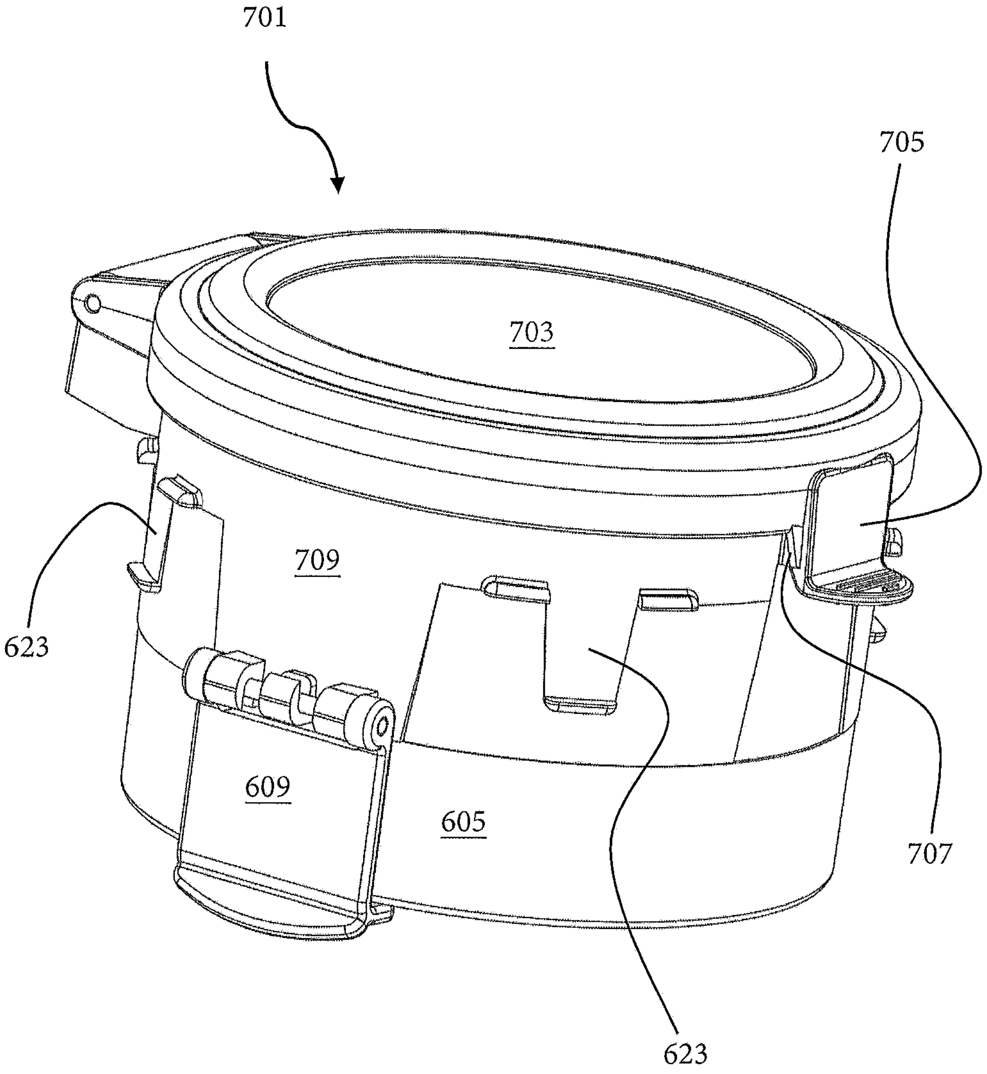
FIG. 7 is a perspective view of an alternative embodiment of a portable air-tight water-tight reusable trash receptacle according to the present application.

Referring now also to FIG. 7, an embodiment of a portable air-tight water-tight reusable trash receptacle with a hinged lid is shown. Trash receptacle 701 should be understood, unless otherwise stated herein, to be the same as or substantially similar to receptacle 601. The only differences between trash receptacles 701 and 601 are due to the lack of a handle on hinged lid 703. Because hinged lid 703 does not contain a handle like handle 615 on hinged lid 607, hinged lid 703 contains a locking tab 705 designed to hook over tab catch 707 formed in outer ring 709.

Tab catch 707 may be the same or substantially similar to tab catch 611, in which case outer ring 709 is the same as or substantially similar to outer ring 603, or tab catch 707 may be designed slightly differently than tab catch 611. For example, tab catch 707 is shown to be a bit wider than tab catch 611 and is shown to protrude from outer ring 709 slightly less than tab catch 611 protrudes from outer ring 603. Locking tab 705 is made of a material flexible and elastic enough that a user may bend locking tab 705 away from outer ring 709 and tab catch 707 so that hinged lid 703 may be opened. Locking tab 705 must have enough elasticity that the tab returns to its original shape and position after it is bent away from tab catch 707.

Figure 8A:
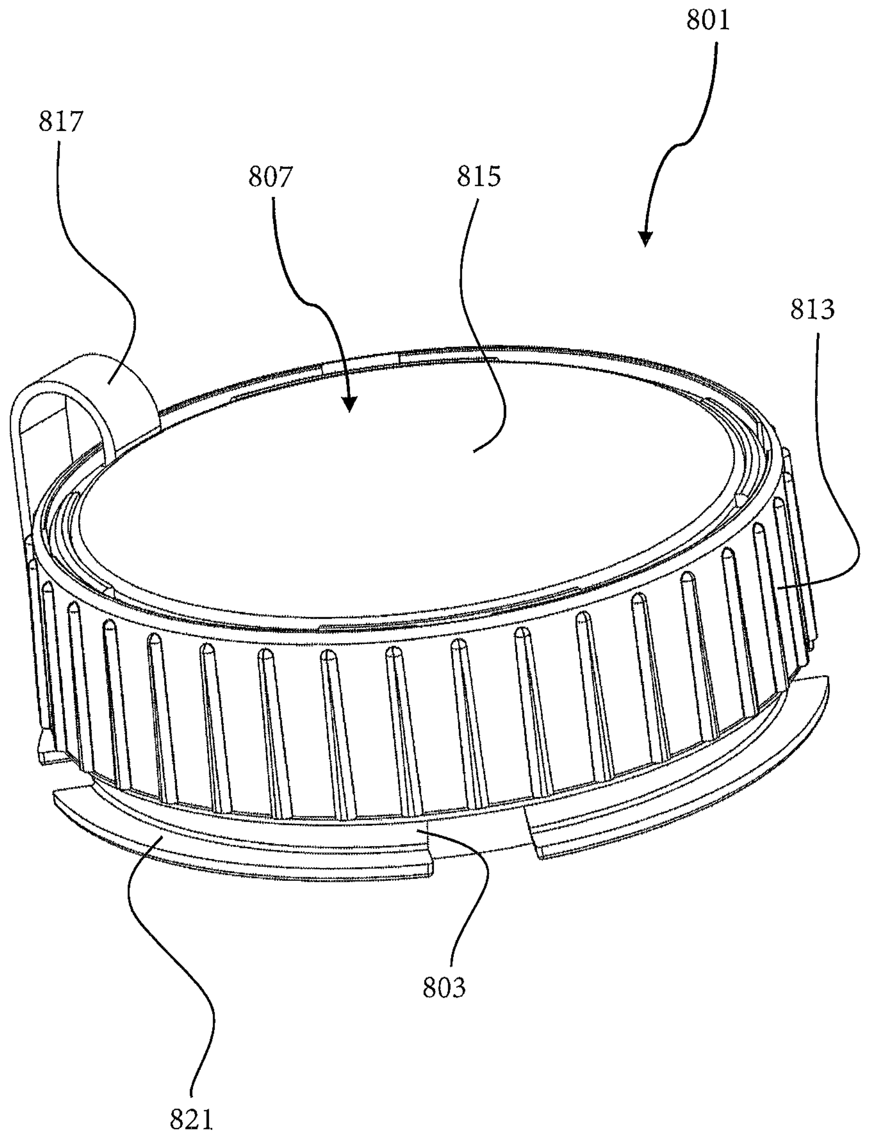
FIG. 8A is a perspective view of an alternative embodiment of a portable air-tight water-tight reusable trash receptacle according to the present application.
Figure 8B:
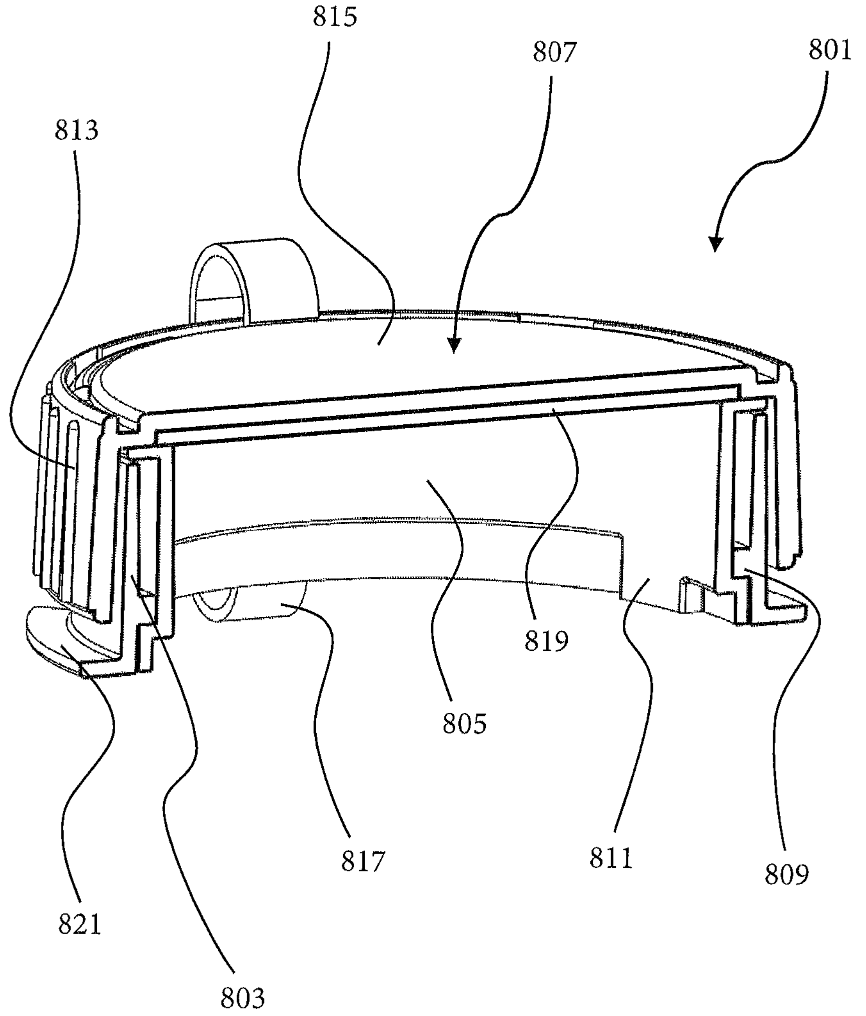
FIG. 8B is a cross-sectional view of the embodiment shown in FIG. 8A.

Referring now also to FIGS. 8A and 8B, an embodiment of a portable air-tight water-tight reusable trash receptacle having an outer ring and inner ring which rotatably couple together is shown. Trash receptacle 801 has an outer ring 803, and inner ring 805, and a lid 807. Lid 807 preferably is made of two main portions, a rotating ring 813 and a top 815. The cross section of FIG. 8B shows top 815 and ring 813 as being one piece, but it should be understood that top 815 is a distinct piece secured within rotating ring 813 such that ring 813 and top 815 rotate with respect to each other about one shared axis. Rotating ring 813 rotatably couples to outer ring 803 by threads (not shown) present on the exterior area of outer ring 803 and the inside surface of ring 813. Top 815 is attached to outer ring 803 by a solid flexible tether 817. Tether 817 is preferably made of a durable and flexible material such as polymer, rubber, durable fabrics, or any other suitable material.

Outer ring 803 preferably contains tabs 809 on the interior surface of outer ring 805. Inner ring 805 preferably contains slots 811 on the outside surface of inner ring 805. In use, tabs 809 and slots 811 interface together such that outer ring 803 and inner ring 805 rotatably couple together. Preferably, slots 811 are designed such that outer ring 803 is secured to inner ring 805 by inserting tabs 809 into slots 811 and turning outer ring 803 roughly one eighth of a complete rotation. In other embodiments, slots 811 may allow for greater or lesser degrees of rotation used to secure inner ring 805 into outer ring 803. Tabs 809 may have protrusions that interface with notches formed in slots 811, similar to how protrusions 315 might interface with notches 215.

In use, a liner (not shown) is partially inserted through inner ring 805, while a certain length of the liner at the open end of the liner is drawn over the top edge of inner ring 805. Inner ring 805, along with the liner, is then secured to outer ring 803 by inserting tabs 809 upward into slots 811 and turning outer ring 803 roughly one eighth of a complete rotation such that tabs 809 slide relatively sideways along slots 811. The liner is therefore secured between inner ring 805 and outer ring 803. Lid 807 is then pulled to the top edge of outer ring 803, and rotating ring 813 is rotated about outer ring 803 such that the threads engage and lid 807 is secured onto outer ring 803. Top 815 of lid 807 engages with liner portion supported by the top edge of inner ring 803. As shown in FIG. 8B, top 815 preferably contains a seal 819 that compresses against the liner such that an air-tight and water-tight seal is formed between lid 807 and the liner. As seen also in FIG. 8B, and similarly to other trash receptacles described in the present application, a clearance area is formed between inner ring 805 and outer ring 803 such that excess portions of the edge of the liner at the open end are held within the clearance area.

Outer ring 803 is shown to have a recessed area above protruding lips 821. Trash receptacle 801 preferably has a fabric cover such as any of the covers previously disclosed in the present application, or a cover of any other design appropriate for use as described below herein. In use, after a liner has been secured between inner ring 805 and outer ring 803, and after lid 807 has been secured to outer ring 803, a cover may be drawn over lips 821 and secured into the recessed area by an elastic strap within the cover, or may be secured into the recessed area by a user tightening a strap attached to the cover such as a hook-and-loop type strap or a tightening d-ring strap.

Figure 9A:
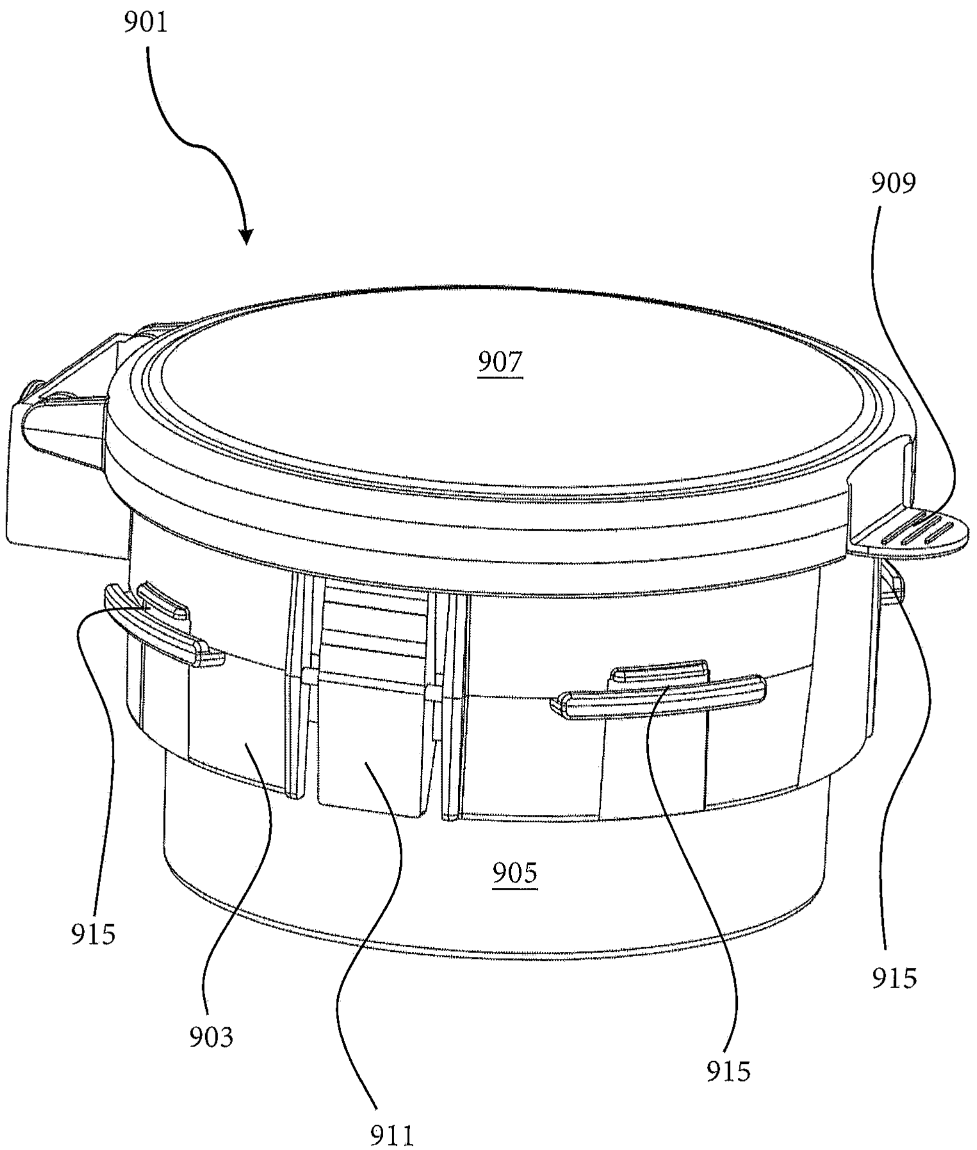
FIG. 9A is a perspective view of an alternative embodiment of a portable air-tight water-tight reusable trash receptacle according to the present application.
Figure 9B:
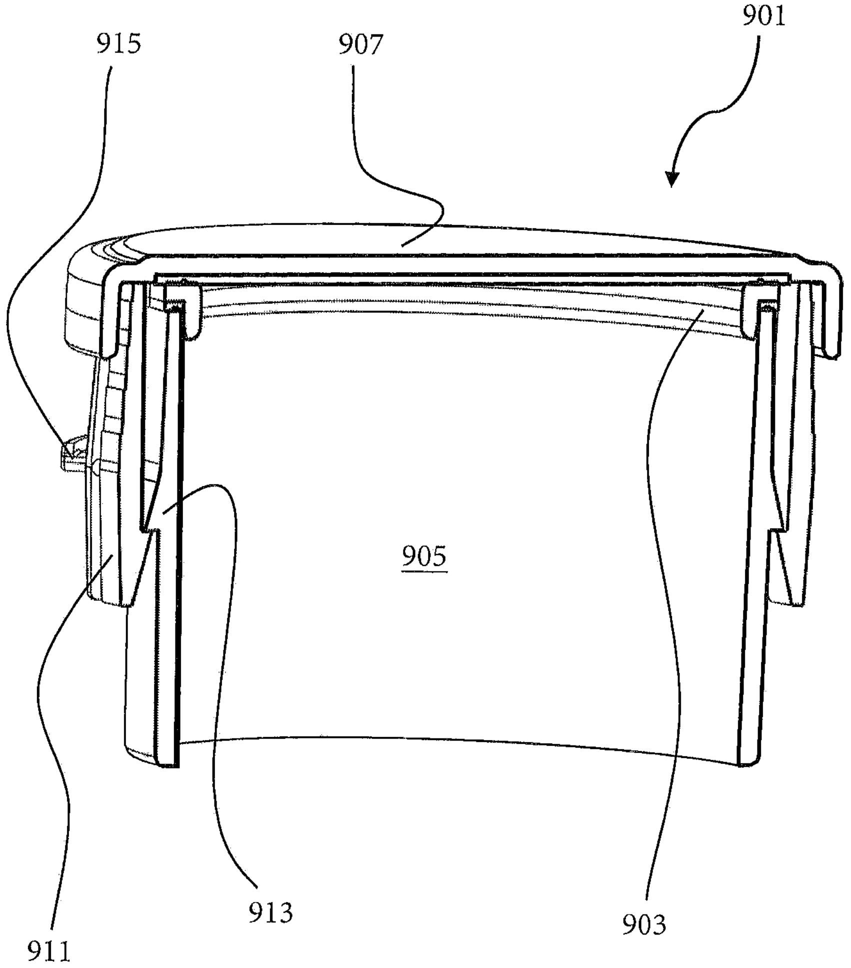
FIG. 9B is a cross-sectional view of the embodiment shown in FIG. 9A.

Referring now also to FIGS. 9A and 9B, an embodiment of a portable air-tight water-tight reusable trash receptacle having an outer ring and inner ring which couple together with push tabs is shown. Trash receptacle 901 generally comprises an outer ring 903, an inner ring 905, and a hinged lid 907. Lid 907 is hingeably attached to outer ring 903 similarly to lids 607 and 703 above. Lid 907 contains a locking tab 909 similar to locking tab 705 which interfaces with a tab catch on outer ring 903 similar to tab catch 707. Outer ring 903 has push tabs 911 that secure outer ring 903 to inner ring 905. Push tabs 911 preferably pivot with respect to outer ring 903.

Referring now specifically to FIG. 9B, a cross section of trash receptacle 901 is shown. Inner ring 905 has a raised lip portion 913 that protrudes from the outside surface of inner ring 905 and extends all the way around inner ring 905. Push tabs 911 hook over the flat face of lip 913. Push tabs 911 may have springs (not shown) held between push tabs 911 and outer ring 903 such that force is applied to each push tab 911 sufficient such that push tabs 911 do not disengage lip 913 unless a force is applied to push tabs 911 such that push tabs 911 pivot away from and disengage lip 913. Because lip 913 also has a slanted face as shown in FIG. 9B, inner ring 905 may be inserted into outer ring 903 without requiring that a user manipulate push tabs 911 because tabs 911 will slide along the slanted face of lip 913 until they reach the flat face of lip 913 and hook over lip 913.

In use, trash receptacle 901 is generally similar to the other trash receptacles disclosed herein, A liner (not shown) is inserted through inner ring 905 with a certain portion of the liner near the open end of the liner pulled over the top edge of inner ring 905. Inner ring 905 is inserted into outer ring. 903 and secured by push tabs 911 such that the liner is held between inner ring 905 and outer ring 903. A clearance area is formed between inner ring 905 and outer ring 903 sufficient to hold excess portions of the edge of the liner along the open end of the liner while the liner is secured between inner ring 905 and outer ring 903.

Outer ring 903 may have a flat ring seal or O-ring seal held on the outer ring 903 above the top edge of inner ring 905 such that an air-tight and water-tight seal is formed between outer ring 903 and the portion of the liner supported by the top edge of inner ring 905. Hinged lid 907 may have a flat seal or O-ring seal that engages the top edge of outer ring 903 to form an air-tight and water-tight seal. The combination of seals within receptacle 901 creates an air-tight- and water-tight trash receptacle when a liner is held between inner ring 905 and outer ring 903 as described.

Outer ring 903 contains cover catches 915 on the exterior surface of outer ring 903. Trash receptacle 901 is designed to utilize a fabric cover (not shown) such as the covers previously disclosed in the present application, or any other fabric cover appropriate for use with cover catches 915. When a liner is secured within trash receptacle 901, the cover may be pulled over the liner and over outer ring 903 and cover catches 915. The cover may then be secured by an elastic strap, hook-and-loop type strap, or other tightening strap. Alternatively, the cover may have a lip or other feature formed along its open end to hook onto cover catches 915 to secure the cover to outer ring 903.

Figure 10:
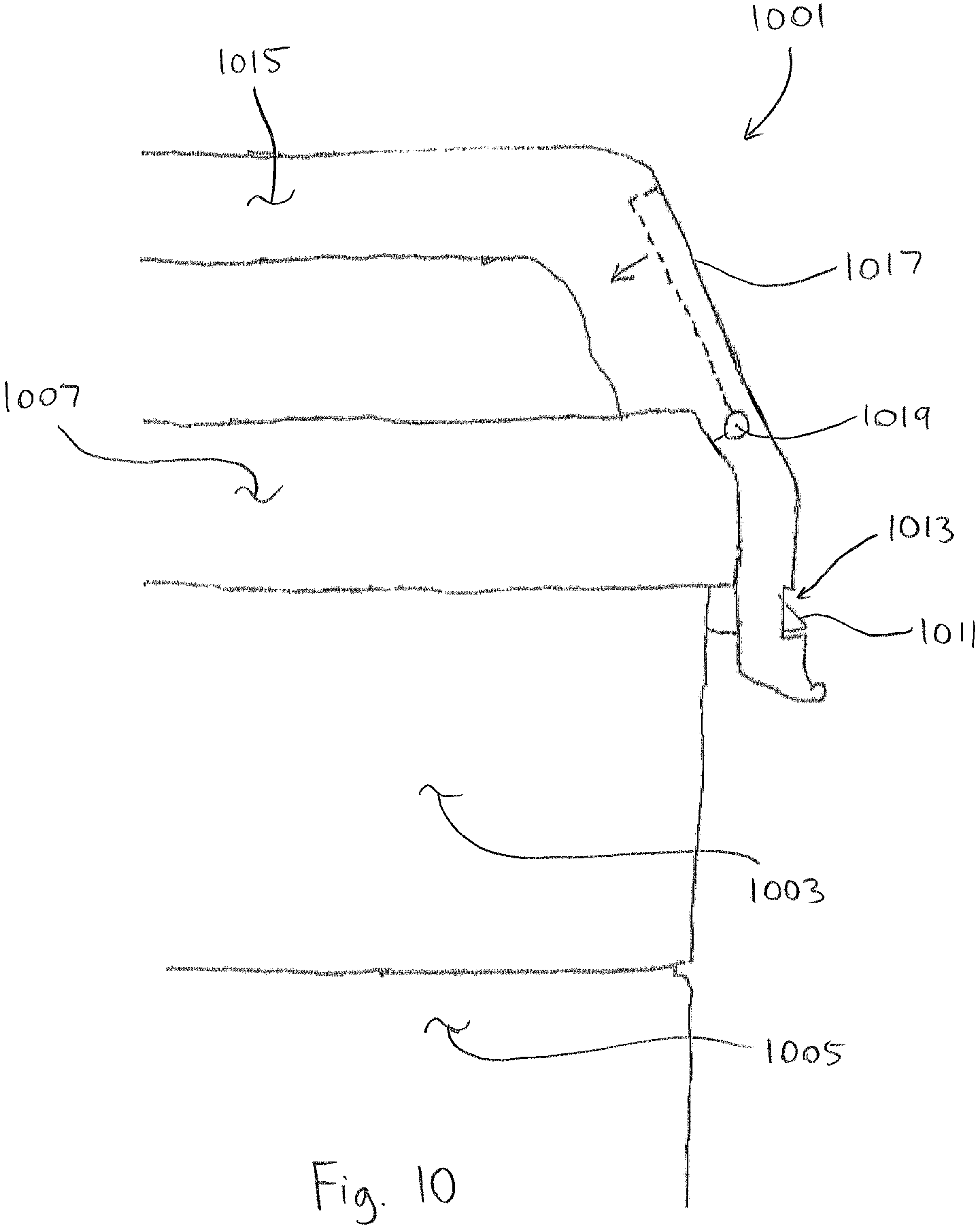
FIG. 10 is a partial view of an alternative embodiment of a portable air-tight water-tight reusable trash receptacle according to the present application.

Referring now also to FIG. 10 in the drawings, an alternative embodiment of a portable air-tight water-tight reusable trash receptacle with a hinged lid is shown. Trash receptacle 1001 is substantially similar to trash receptacle 601. Trash receptacle 1001 preferably includes outer ring 1003, inner ring 1005, hinged lid 1007, and handle 1015, which are all configured for operation similar to the trash receptacle 601 described above. Hinged lid 1007 is configured for opening and closing via opening 1013 and tab catch 1011, again, like the above described trash receptacle. However, the configuration of trash receptacle 1001 is unique in that it allows for much easier opening of the hinged lid 1007 with one hand. Handle 1015 includes pressure point 1017 and pivot point 1019.

With this unique configuration, a user of the invention can hold the trash receptacle with one hand and have their thumb rest on pressure point 1017. When the user wants to open the lid, the user applies pressure to pressure point 1017 with their thumb, and the handle pivots along pivot point 1019, Pivot point 1019 may contain a spring that is configured to keep the handle closed when not under pressure. This pivoting motion releases the handle from tab catch 1011, and thus opens the lid. This unique configuration for a trash receptacle is useful for a variety of purposes, but is specifically designed with paramedics, EMTs, and nurses in mind. When those professionals are working in the field, they often deal with various pieces of medical waste, such as needles and soiled clothes, which need to properly be disposed of. As field work often occurs away from a waste container, the workers do not have a proper way to dispose of waste until after an emergency is over. The present invention may be carried into the field via a carrying case or attachment to a belt loop, or even via other means, for the emergency workers to have easy access at any point in time. The medical waste can then immediately be disposed of while working in the field via a special bag for medical waste integrated into the portable trash receptacle described herein.

Figure 11A:
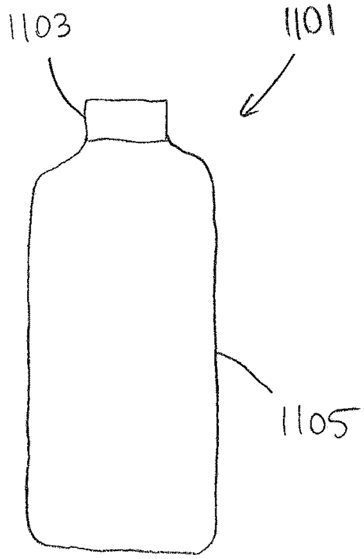
FIG. 11A is a front view of a bag for use with an alternative embodiment of a portable air-tight water-tight reusable trash receptacle according to the present application.
Figure 11B:
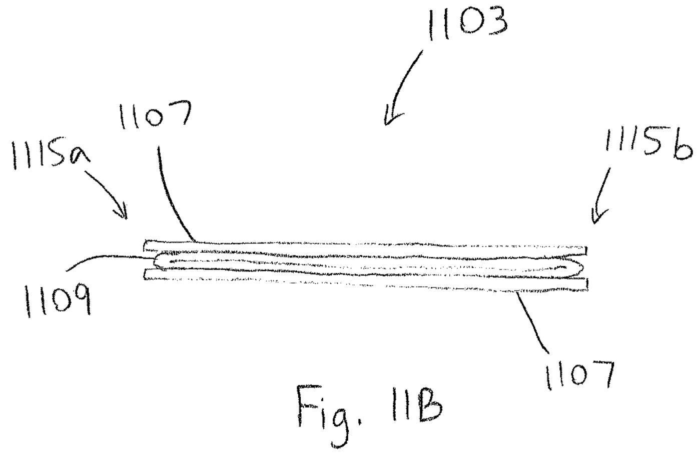
FIGS. 11B and 11C are top views of the bag of FIG. 11A.
Figure 11C:
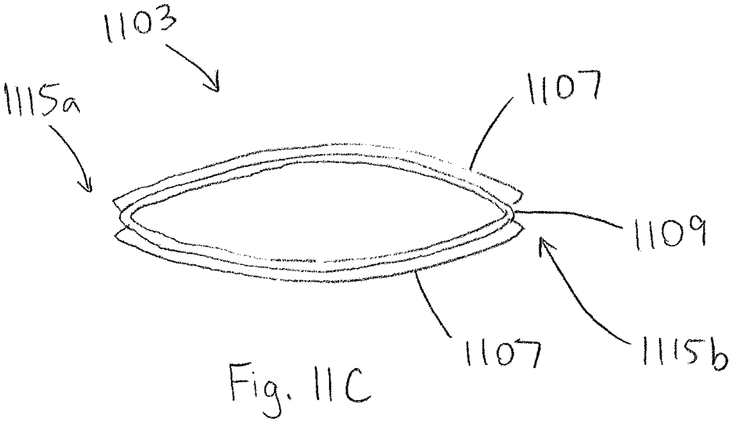

Referring now also to FIGS. 11A-11E in the drawings, various views of a bag integration into a portable air-tight water-tight reusable trash receptacle. Bag 1101 preferably includes a top portion 1103 and bladder 1105. Under the preferred embodiment, bladder 1105 is a puncture-proof rubber material. However, it should be appreciated that alternative embodiments may use other puncture-proof materials that also prevent any punctures from sharp objects, such as needles, knives, or other sharp medical instruments. FIGS. 11B and 11C best illustrate the functionality of top portion 1103. The top portion 1103 illustrated in FIG. 11B is in its closed form, in a substantially flat configuration, while the illustration in FIG. 11C is in an opened position. The bag 1101 is preferably designed to be stored in the closed form until it is put into operation, when it is moved into the opened position. Top portion 1103 includes at least one structural component 1107 and tube liner 1109, both of which have end portions **1115*a* and 1115*b*. To transform the bag 1101 from closed form to an opened position, a user can squeeze the top portion 1103, such that end portions 1115*a* and 1115*b* are moved toward each other, creating an opening in the middle. Preferably, structural component 1107 is a cardboard sleeve, but it should be appreciated that alternative materials, such as plastic or other hard forms, may be used for forming the sleeve shape. Tube liner 1109** is preferably a plastic liner, but other materials may be used in alternative embodiments.

Figure 11D:
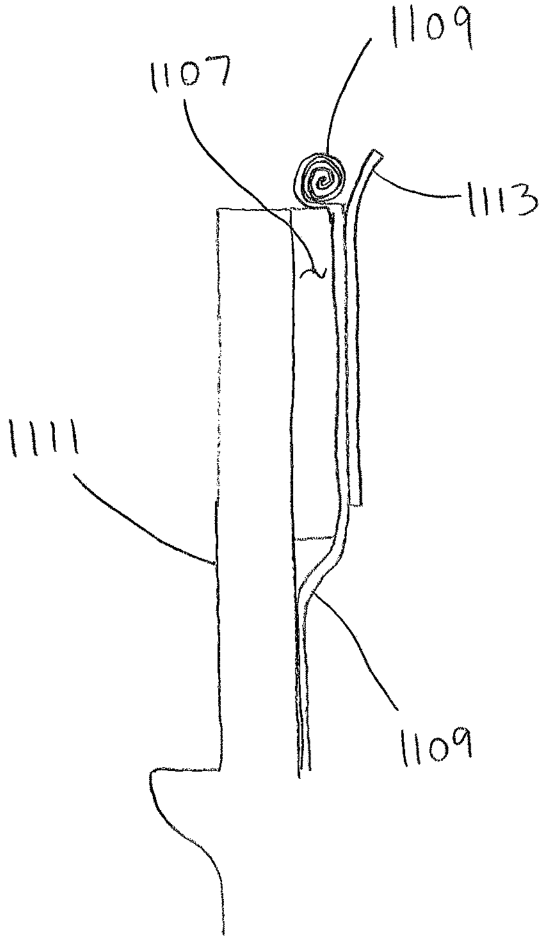
FIGS. 11D and 11E are partial side views of an alternative embodiment of a portable air-tight water-tight reusable trash receptacle according to the present application.
Figure 11E:
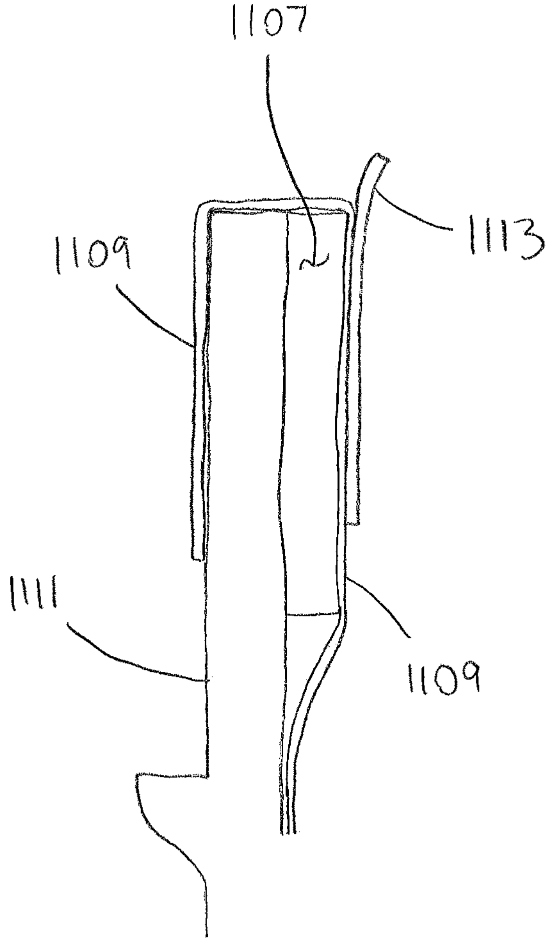

FIGS. 11D and 11E best illustrate the bag 1101 integrated into trash receptacles described above. The trash receptacle includes inner ring 1111, which is substantially similar to the inner ring of the above described embodiments. Preferably, when integrated into the system, the structural component 1107 rests against a surface of the inner ring 1111, and the tube liner is then stretched over the top surface of the inner ring 1111. FIG. 11D illustrates tube liner 1109 with a rolled up top portion, while FIG. 11E best illustrates the same tube liner 1109 rolled out over inner ring 1111, such that the bag 1101 can be secured within the trash receptacle. Bag 1101 also preferably includes tab 1113, which is coupled to an adhesive portion of tube liner 1109. When tab 1113 is pulled, the adhesive portion of tube liner is revealed, such that the bag 1101 may be secured shut. For example, once the bag 1101 is full, or is otherwise ready to be disposed of, the user may pull tab 1113 to reveal the adhesive surface, and then may press the adhesive surface of the bag 1101 together, such that the bag 1101 is sealed shut preventing contained items from spilling out. This unique configuration allows for more efficient and sanitary disposal of products, such as for medical and emergency services as described above.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A trash receptacle for securing trash, comprising:
- an outer ring;
- an exposed tab catch extending outward from the outer ring;
- an inner ring coupled to the outer ring;
- a lid hingeably attached to the outer ring; and
- a handle coupled to the lid, the handle comprising:
  - a pivot point;
  - a pressure point; and
  - a latch having an aperture, the latch configured for opening and closing the lid;
  - wherein the aperture is configured to receive the exposed tab catch when the lid is in a closed position; and
  - wherein engagement of the pressure point causes the latch to raise via the pivot point, so as to cause disengagement of the tab catch from the aperture to allow for opening and closing of the lid.

2. The trash receptacle for securing trash of claim 1, further comprising:
- at least one hinged clip for securing the outer ring to the inner ring.

3. The trash receptacle of claim 1, wherein the lid creates a seal in the closed position.

4. The trash receptacle according to claim 1, further comprising:
- a first seal between the outer ring and the lid; and
- a second seal between the inner ring and the outer ring.

5. The trash receptacle according to claim 1, further comprising:
- a cover.

6. The trash receptacle of claim 1, wherein the pivot point is a spring.

* * * * *